United States Patent [19]

Meyman

[11] Patent Number: 4,640,242
[45] Date of Patent: Feb. 3, 1987

[54] ROTARY ENGINE

[76] Inventor: Usher Meyman, 230 Ocean Pkwy., Brooklyn, N.Y. 11218

[21] Appl. No.: 642,871

[22] Filed: Aug. 21, 1984

[51] Int. Cl.⁴ .............................................. F02B 53/00
[52] U.S. Cl. ................................... 123/246; 418/134; 418/196
[58] Field of Search ....................... 123/210, 211, 246; 418/131, 134, 196, 58

[56] References Cited

U.S. PATENT DOCUMENTS

| | | | |
|---|---|---|---|
| 3,207,425 | 9/1965 | Morse | 418/196 X |
| 3,747,649 | 7/1973 | Densow et al. | 123/149 D X |
| 3,929,402 | 12/1975 | Schubert | 418/58 X |
| 3,987,758 | 10/1976 | Wankel | 123/210 |
| 4,324,537 | 4/1982 | Meyman | 418/134 X |
| 4,422,836 | 12/1983 | Meyman | 418/58 X |

Primary Examiner—Michael Koczo

[57] ABSTRACT

A rotary engine has covers spaced from one another, rotors located between the covers and planetating in different phases, gearings for synchronizing planetating of the rotors and including first and second gears, a plurality of carriers each connected with the rotors planetating in the same phase and planetating with the same, eccentric shafts arranged to support the carriers during their planetating; elements for connecting said covers with one another.

6 Claims, 12 Drawing Figures ive engine with sixteen rotors;

ROTARY ENGINE

BACKGROUND OF THE INVENTION

The present invention relates to a rotary engine.

Rotary engines of the Wankel type are known, having one or more rotors located between side covers. They have a high specific power. However, because of the problems with sealing of the working chambers, they did not find sufficiently wide application. There are also known multi-rotor rotary engines with rotors located between covers and rolling over one another, e.g U.S. Pat. Nos. 3,207,425; 3,929,402 and 4,422,836, and French Pat. No. 2,293,577. The rotary engines are provided with internal or external gearings for synchronizing the rotation of each rotor. Eccentric shafts are provided with gears meshing with one another or with gears of an output shaft. These engines possess, however, the disadvantages in the fact that wear of end faces of rotors and covers takes place, whereby hermetization of the working chambers is difficult and efficiency is low. The rotary engines having a plurality of gears are relatively complicated.

On the other hand, a method of expelling of a part of fuel mixture in the beginning of the compression stroke is known, which lead to a double increase of indicated efficiency of the engine, but is not used since the specific power is considerably reduced, and mechanical losses remain the same so that their share in total energy balance considerably increases.

SUMMARY OF THE INVENTION

Accordingly, it is an object of the present invention to provide a rotary engine which avoids the disadvantages of the prior art.

In keeping with these objects and with others which will become apparent hereinafter, one feature of the present invention resides, briefly stated, in a rotary engine having covers, rotors located between the covers, gearings for synchronizing rotation of the rotors, eccentric shafts and threaded elements for connecting the covers with one another, wherein the threaded elements are provided with means for their automatic turning and fixation.

Carriers can further be provided, connected with the rotors rotating in the same phase. Each carrier can be connected with the rotors by their axle and, in this case mounted on the eccentric shafts. The carrier can be connected with the rotors by eccentrics of the axles and, in this case freely hung on these eccentrics.

Each working chamber can be provided with one or more individual electric ignition system. The armature windings of the electric generator can be wound on the axles of the rotors, while the magnets can be arranged in the covers.

The novel features of the invention are defined in the appended claims. The invention itself will be best understood from the following description accompanied by the drawings.

DESCRIPTION OF A PREFERRED EMBODIMENT

Figure 2:
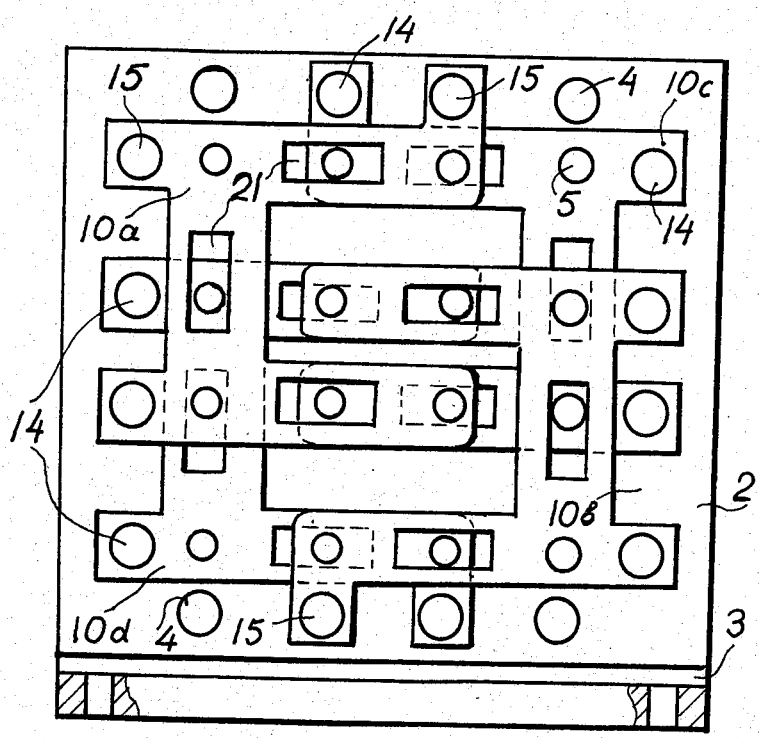
FIG. 2 is a schematic view of arrangement of carriers of the inventive engine.
Figure 3:
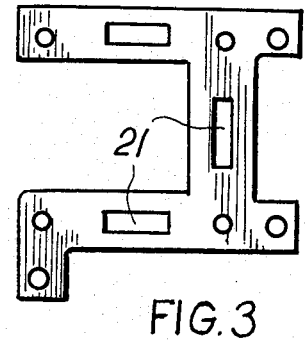
FIGS. 3 and 3a are views showing the shape of carriers.
Figure 3A:
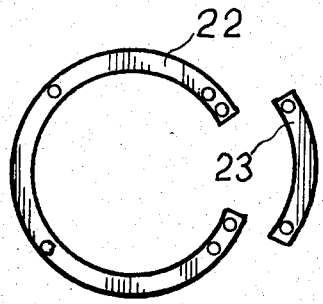

A rotary engine in accordance with the present invention includes sixteen rotors arranged between covers 2 and 3 in four rows with four rotors in each row. The covers are held in position by studs 4 each having right- and left-hand threads on its ends. The rotors 1 are provided with axles 5 having eccentrics or pins 6. The axles 5 of four central rotors have gears 7 which mesh with internal gears 8 fixed to a cover 9. The value of teeth ratio may be, for example, 3:4. Since in any position each rotor does not extend beyond the limits of describing the same imaginary square and always contacts it at four sides, the neighboring rotors always contact one another. Eight H-shaped carriers 10 (10a,10b,10c,10d shown in FIGS. 2 and 3) and four C-shaped carriers 11 (FIG. 3a) are further provided.

Two carriers 10a are connected with the first and third axles of the first (upper) and the third rows of the rotors rotating, for example, clockwise.

Two carriers 10b are connected with the second and fourth axles of the second and the fourth rows of the rotors rotating in the same direction, but in opposite phase to the first group of the rotors.

Two carriers 10c are connected with the second and the fourth axles of the first and the third rows of the rotors rotating counterclockwise.

Finally, two carriers 10d are connected with the first and the third axles of the second and the fourth rows of the rotors rotating also counterclockwise, but in opposite phase.

Thus, each four rotors forming any working chamber are connected with all carriers 10.

Each carrier 10 is mounted on eccentrics 12 and 13 of two or more shafts 14 or 15. Therefore, the carriers are formed as parallel link mechanisms urging the axles of the rotors to rotate eccentrically. The shafts 14 and 15 may be located in any convenient place. Each carrier is always under workloads, because some two of its rotors alternately participate in the next expansion stroke. Therefore, the carriers, as well as the shafts 14 and 15, are loaded permanently by the comparatively slow-changed workload. The eccentrics 12 and 13 have the same eccentricity as the gears 7. Four shafts transmitting the torque have gears 16 or 17 rotating in opposite directions and meshing with an identical teeth ratio respectively with a gear 18 and an internal gear 19 both fixed on an output shaft 20. Eight shafts serve as supports preventing the skewness of the respective carriers 10, but they may also be provided with the gears 16 and 17. For this purpose, the axes of the shafts may be located on a common cylindrical surface. Each carrier 11 is connected (in the same sequence as the carriers 10) with four eccentrics 6 of the axles 5 including one axle of the four central rotors. There may be any eccentricity of the eccentrics 6.

Each central rotor rotates eccentrically around the axis of the gear 8 in one direction and with gear 7 around their axis in the opposite direction. Rotation of the four central rotors about their axes is transmitted by carriers 11 and the eccentrics 6 to the other twelve rotors, thereby all rotors rotate synchronously in the respective phases.

Thus, the rotation of all rotors is synchronized only by four internal gearings and four gears transmitting the torque. The engine may have different numbers of the rotors.

The axles of each row of the rotors are always located in a horizontal plane which moves up and down. The axes of each column of the rotors are always located in a vertical plane which moves in the horizontal direction. Thereby any two neighboring axles change the distance between their axes only in these planes, and the axles connected for example with the carriers 10a can move freely in narrow ports 21 of the parallel carriers 10c and 10d and vice versa. Four groups of rotors together with the carriers connected therewith are in mutually symmetrical movement, and thereby the whole system is in the condition of equillibrium. However, each group of the rotors with the carriers can be balanced separately by counterweights attached to the shafts 14 and 15. The carriers 10 and 11 may have any expedient form. Specifically, the carrier 11 which does not transmit any workload may be formed as a narrow and thin ring 22 (FIG. 3a) having superposed segment 23. Any four rotors (instead of the central rotor) connected with different carriers 10 may be provided with internal gearings. If all sixteen rotors are provided with the internal gearings, the engine does not need the carriers 11. On the contrary, the engine may be provided only with the carriers 11 if all rotors have eccentric shafts which are synchronized by gears transmitting the torque. The engine may include two parallel multi-rotor sections having only four carriers 10 arranged between the sections. The rotors may be mounted freely on their axles fixed in the carriers 10. In this case, the gears 7 and the eccentrics 6 may be fixed on side surfaces of the rotors. The shafts 14 and 15 may be mounted in the base members, and the covers 2 and 3 may be diminished to overlap only the rotors.

All studs 4 are loaded permanently since each of crosswise located pairs of the working chambers is alternately in the next expansion stroke. Besides that, the area of the covers which is under working pressure, expands while the pressure drops. Therefore, the comparatively small-changed axial force distributes equally among the studs, and they as well as the covers 2 and 3, are in better condition than the respective parts of the known engines.

Figure 4:
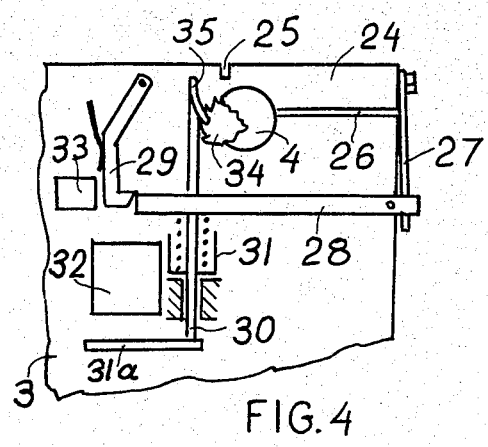
FIGS. 4 and 5 are schematic views showing means for fixation of covers.

Means for adjusting a position and fixation of the covers 2 and 3 is further provided, which can be used both for the Wankel-type engines and for other rotary engines. This means includes a brake block 24 (FIG. 4) formed by cuts 25 and 26 in both covers, links 27, levers 28, spring-biased stop catches 29, spring-biased rods 30 with caps 31 and a magnetic mass 31a, and electromagnetic (or pneumatic and the like) devices 32 and 33. Means for turning the studs 4 includes a ratchet 34 and pawl 35 connected with the rod 30.

The devices 32 are turned on simultaneously with ignition by closing of the circuit of the electromagnetic device 32, and they attract the magnetic mass 31a and lift the pawls 35 by the rods 30, then turn the levers 28 by caps 31, pull the brake blocks 24 by the links 27 and jam the studs. After the stop catches 29 are moved under the levers 28, the devices are turned off by those stop-catches which breaks the circuit of the electromagnetic device 32. When the ignition is turned off, the devices 33 turned on for a short time, pull the stop catches 29, and the levers 28 release the brake blocks 24. Further, the spring-biased rods 30 pull the pawls 35, turn the ratchets 34 and the unbraked studs each having right- and left-hand threads on its ends, press the covers 2 and 3 to the rotors as easily as it is designed. The next turning on of the ignition brakes the covers in this position. Thus, practically 100% hermetization of the working chambers is achieved without the use of any sealing elements and with the least friction and wear of the working surfaces.

Figure 5:
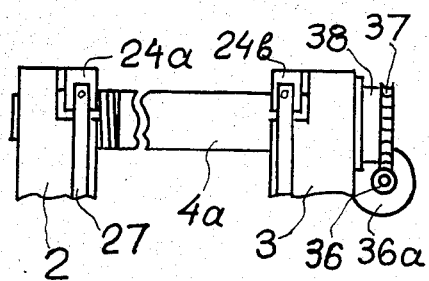

The same automatic control may be performed by a mechanism shown in FIG. 5. A low-speed micromoter 36a having a worm 36 on its shaft is turned on when the brake blocks 24a and 24b release a cap screw 4a having a worm wheel 37 instead of a cap. The micromotor is turned off and the brake blocks actuated by levers 28 shown in FIG. 4 and moved in the above-described manner jam the cap screw when pressure in the pressure transducer, for example a pressure sensitive element 38 rises to a desired limit.

The brake blocks may be installed as supplement to the covers instead of cutting them by the cuts 25 and 26.

Figure 6:
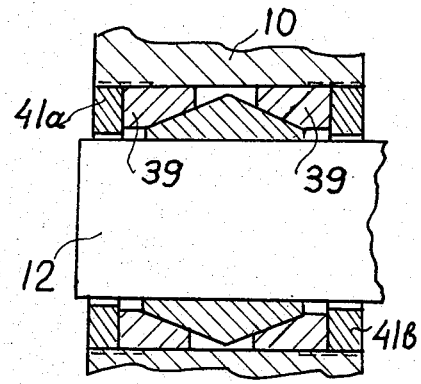
FIG. 6 is a view showing a sliding bearing.

The inventive rotary engine may be provided with self-compensating plain bearings. As can be seen from FIG. 6, the bearing has two shells 39 with conical working surfaces which contact with conical surfaces of a bush 40, fixed on the shaft 14, and screw bushings or washers 41a and 41b having a threads of opposite directions. The shells 39 and the washers 41a and 41b are arranged in a hole having left and right threads from the opposite sides.

If such a bearing is arranged on the eccentric 12 (or 13), then inertia forces are produced in the washer during its eccentrical rotation and urge to roll it on the surface of the hole in the direction of rotation of the eccentric. Since the ratio of the diameters of the washer and the hole is close to 1, the washer will slowly turn in opposite direction and is screwed into the hole. Thereby both washers move the shells toward one another until the gap available between the surfaces of the bush and shells is eliminated. The necessary force interaction between the parts of the bearing is achieved by selection of the angle of inclination of the contacting surfaces, by the mass of the washers (screw bushings), and also by parameters of the thread. Light washers which are screwed into the hole at the moment when the workloads are absent may be provided in the bearings arranged on the axles and eccentrics 6. The bush 40 may be installed with possibility of axial displacement, for example on splines. Such bearings may be arranged on the shafts 14 and 15 in the cover 2 so as not to prevent the adjustment of the distance between the covers 2 and 3, and also on the axles 5 so as to allow the rotors to select the central position between the covers 2 and 3, corresponding to the minimal values of friction and therefor wear. The bearings may have only one turning washer.

The washers of the bearing mounted on the shafts 14 and 15 in the covers 2 and 3 may be screwed in by mechanisms similar to those described above for turning of the studs. However, the shells themselves can also be screwed in, if provided with a thread.

Figure 7:
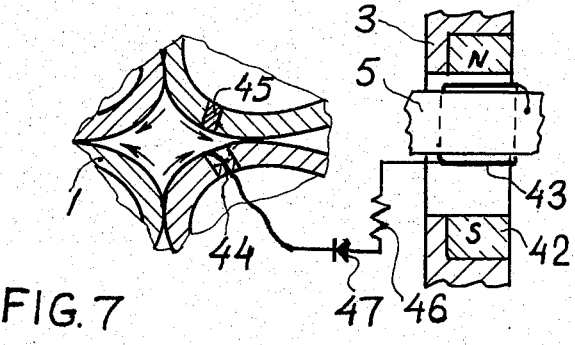
FIGS. 7 and 8 are schematic views showing ignition systems.

Each working chamber may have an independent ignition system with its own electric generator. This system includes a permanent magnet 42 (FIG. 7) fixed in the cover, a winding 43 applied to the axle 5 and having one end brought out to the axle and the other end connected with an electrode 44 installed in a pit in the rotor, and a magnet (electromagnet having a different circuit or permanent magnet) 45 fixed in the neighboring rotor. The circuit may include a resistor 46, a rectifier 47 and/or other elements. A springy end of the electrode 44 contacts the rotor. The winding 43 induces a current, but the magnet 45 interrupts the circuit when it attracts the end of the electrode, and a spark jumps between this end and the surface of the rotor. Then the electrode and the magnet leave the combustion zone. If the springy electrode end is somewhat inclined, the ignition advance can be varied by centrifugal forces which promote the magnet to actuate this end at a greater distance, i.e. earlier (directly proportional to the speed of rotor rotation). The ignition advance may also be varied by changing of the current parameters in the circuit of the electromagnet 45.

Figure 8:
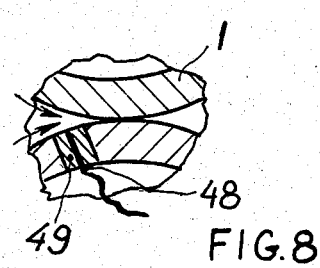

A spark may jump between the electrode 48 (FIG. 8) having insulator 49, and surface of the neighboring rotor at the distance changing directly proportionally to the rotor speed, i.e. voltage in the winding 43.

Magnets of the electric generators may be fixed in the slots 21 of the carriers or on the axles, and windings may be located in the rotors. Each working chamber may be provided with two or more above-described spark plugs uniformly distributed in the combustion chamber. Therefore the mixture will burn out completely and faster, reducing the ignition advance range. The above described systems operate in light condition and can work to reduce wear of the engine.

Figure 1:
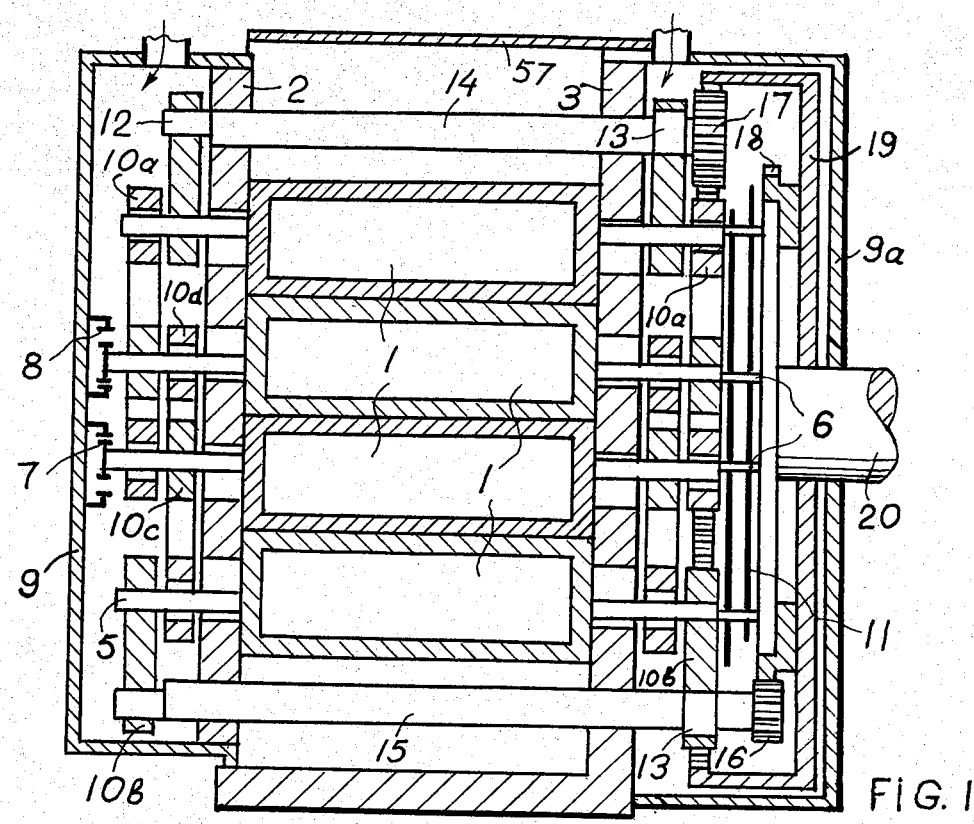
FIG. 1 is a view showing a section of an inventive rotary engine with sixteen rotors.
Figure 9:
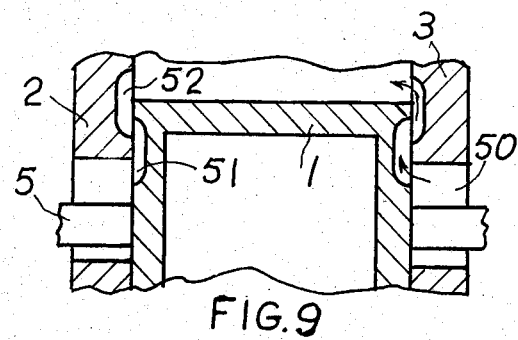
FIGS. 9 and 10 are fragmentary sectional views illustrating a process of gas exchange.
Figure 11:
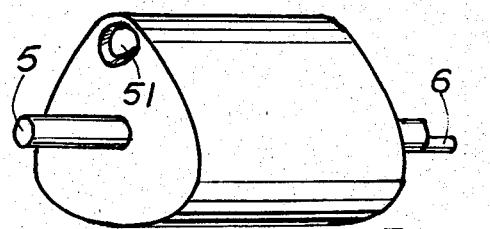
FIG. 11 is a view showing the shape of a single rotor.
Figure 10:
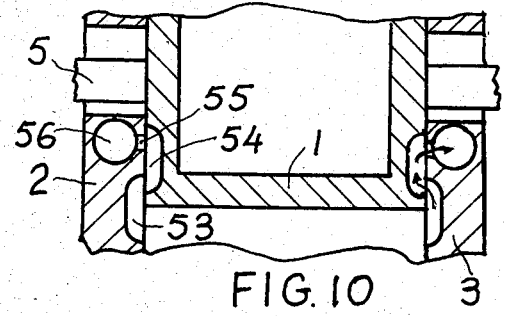

The mixture flows (see arrows in FIG. 1) into the spaces enclosed by the covers 9 and 9a and is agitated in addition by the carriers, then flows into the working chambers through holes 50 (FIG. 9) in the covers 2 and 3, grooves 51 in some rotors and grooves 52 in the covers. Exhaust gases leave through grooves 53 (FIG. 10) in the covers, grooves 54 in the other rotors, openings 55 and channels 56 in the covers. Symmetrical location of all grooves equillibrates the axial reactions applied to the rotors.

The inventive engine has much higher specific power than in the known engines. Such an engine with sixteen rotors (nine working chambers) which are located in a rectangular parallelepiped having a volume of 4,000 c.c (20×20×10) and rotate at only 5,000 r.p.m., will develop a power about 3.5 liter piston engine. However, owing to the small eccentricity and dimensions of the rotors, absence any sealing elements, insignificant friction and wear of the working surfaces and high mechanical efficiency, the engine can work with essentially higher speed than the known engines. As a result, it has a large power reserve. Therefore, this engine can use the six-stroke cycle convenient for its mechanical diagram with two extra strokes for a better agitation of fuel-air charge in the working chambers. Moreover, a method which stipulates for an expulsion of some fuel-air charge from the cylinders during the compression stroke and provides for the doubling of the indicated efficiency but reduces in power and increases a share of mechanical losses, becomes effective in the inventive engine, since it compensates this power reduction and has high mechanical efficiency.

The working surfaces are in week mechanical interaction and better temperature conditions, therefore they do not require any cooling. However, direct air cooling of the working surfaces of the rotors may be provided. Ceramic materials can be used for production of the covers.

The above described ignition system and extra agitation of the mixture promote complete combustion of the fuel. Side by side with this, a low specific fuel consumption determines the superiority of this engine in the exhaust emission reduction over the present engines. The engine may have a jacket 57 with slots, since the inside volume varies when the rotors rotate.

The rotor having trochoidal contour is the most complicated part of the engine. However, difficult technologic problem of mass rotor production can be resolved by means of extrusion of the corresponding tube profile.

The invention is not limited to the details shown since various modifications and structural changes are possible without departing in any way from the spirit of the present invention.

What is desired to be protected by Letters Patent is set forth in the claims.

What is claimed is:

1. A rotary engine comprising:
    two covers spaced from one another;
    a plurality of rotors located between said covers and rotating and planetating in different phases; said rotors interengaging to form working chambers therebetween; means to supply fluid to the working chambers and means to exhaust fluid from the working chambers during the operating cycle of the engine; gearing for synchronizing rotation and planetation of said rotors and each including first and second gears arranged so that one of said gears is connected with said rotors while the other of said gears is connected with an immovable part of the engine and said gears engage with one another;
    a plurality of carriers interconnecting the rotors and planetating in the same phase with the planetation of the rotors for synchronizing the rotation and planetation of the rotors;
    shafts arranged to support said carriers during their planetations; and elements for connecting said covers with one another.

2. A rotary engine as defined in claim 1 and further comprising:
    means for fixation of one of said covers relative to the other of said covers and including brake blocks arranged in each cover, and electromagnetic devices arranged to act onto said brake blocks in response to ignition of the engine so that the brake blocks hold said connecting elements and therefore said covers cannot move relative to each other during operation of the engine.

3. A rotary engine as defined in claim 1; and further comprising means for adjusting a position of one of said covers relative to the other of said covers and including adjusting devices each of which is located near a respective one of said connecting elements and includes an electromotor, a worm turnable by said electromotor, a worm wheel meshing with said worm and turnable by the latter, said worm wheel acting on said connecting elements so as to move said covers during inoperative position toward said rotors, and a pressure sensitive element arranged to feel pressure of said worm wheel and to turn off the electromotor so as to press said covers to said rotors.

4. A rotary engine as defined in claim 1, wherein said rotors have axles; and further comprising ignition system including generators with armature windings which are wound on said axles of said rotors and with magnets located in said covers, and ignition plugs arranged in said rotors.

5. A rotary engine as defined in claim 1, wherein said rotors are provided with axles, said carriers being connected with said rotors by said axles and mounted on said eccentric shafts.

6. A rotary engine as defined in claim 1, wherein said rotors are provided with axles having eccentrics, said carriers being connected with said rotors by said eccentrics of said axles.

* * * * *